(12) United States Patent
Bauckman et al.

(10) Patent No.: US 12,681,448 B2
(45) Date of Patent: Jul. 14, 2026

(54) MANAGING DIGITAL CONNECTIONS OF CONNECTED EQUIPMENT AND DEVICES TO POOL AUTOMATION SYSTEMS

(71) Applicant: ZODIAC POOL SYSTEMS LLC, Carlsbad, CA (US)

(72) Inventors: Mark J. Bauckman, San Marcos, CA (US); Darin Eames, Carlsbad, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 397 days.

(21) Appl. No.: 18/217,485

(22) Filed: Jun. 30, 2023

(65) Prior Publication Data

US 2024/0012374 A1 Jan. 11, 2024

Related U.S. Application Data

(60) Provisional application No. 63/358,809, filed on Jul. 6, 2022.

(51) Int. Cl.
*G05B 15/02* (2006.01)
*H04L 12/28* (2006.01)
*A61H 33/00* (2006.01)

(52) U.S. Cl.
CPC .......... *G05B 15/02* (2013.01); *H04L 12/2821* (2013.01); *A61H 33/005* (2013.01); *A61H 2201/501* (2013.01); *A61H 2201/5015* (2013.01)

(58) Field of Classification Search
CPC ... G05B 15/02; H04L 12/2821; A61H 33/005; A61H 2201/501; A61H 2201/5015
See application file for complete search history.

(56) References Cited

U.S. PATENT DOCUMENTS

| | | | |
|---|---|---|---|
| 2014/0303782 A1* | 10/2014 | Pruchniewski | ........... E04H 4/14 |
| | | | 709/204 |
| 2019/0288913 A1 | 9/2019 | Salgueiro et al. | |
| 2020/0319621 A1 | 10/2020 | Roy et al. | |
| 2021/0243192 A1 | 8/2021 | Kim | |
| 2023/0079982 A1* | 3/2023 | Murphy | ................ H04L 12/282 |
| | | | 4/488 |

OTHER PUBLICATIONS

International Application No. PCT/US2023/026818, International Search Report and Written Opinion mailed on Nov. 22, 2023, 13 pages.
International Application No. PCT/US2023/026818, International Preliminary Report on Patentability mailed on Jan. 16, 2025, 10 pages.

* cited by examiner

*Primary Examiner* — Michael W Choi
(74) *Attorney, Agent, or Firm* — Kilpatrick Townsend & Stockton LLP

(57) ABSTRACT

A method for managing pool and spa connections is described. The method may involve maintaining a first set of permitted connections to the controller, the permitted connections including at least one pool or spa device connection and at least one pool or spa equipment connection. The method may further involve receiving a connection update instruction to adjust the first set of the permitted connections. The method may further involve updating the first set of permitted connections to define a second set of permitted connections.

20 Claims, 6 Drawing Sheets

MANAGING DIGITAL CONNECTIONS OF CONNECTED EQUIPMENT AND DEVICES TO POOL AUTOMATION SYSTEMS

CROSS-REFERENCE TO RELATED APPLICATION

This application claims the benefit of and priority to U.S. Provisional Application Ser. No. 63/358,809 filed Jul. 6, 2022, entitled "Managing Digital Connections Of Connected Equipment And Devices To Pool Automation System," the entire contents of which are hereby incorporated by this reference.

BACKGROUND

Conventional pool control systems may be sold with a fixed number of electrical relays. The number of relays corresponds to the number of different items of equipment that can be powered and controlled by the pool control system. For example, a pool heater may run on a first relay, a circulation pump on a second relay, and a lighting system on a third relay. To add new equipment (e.g., a skimmer), the pool control system may be modified to include an additional relay to control the new equipment. This requires the customer to purchase the new equipment and the relay, and, in some examples, hire a technician to install both. Additionally, given that relays occupy physical space in the control panel, the number of items of equipment that may be connected to a control panel may depend directly on the space available for relays.

Recent advances in pool control and automation enable items of pool equipment to receive power via a low voltage or line voltage line (e.g., via a breaker) and to be controlled via digital connections with a pool automation system. Similar digital connections may be made between connected digital devices. Because such digital connections can be made without a physical link (e.g., relay), the number of digital connections that theoretically may be supported by a pool automation system may be dramatically increased over conventional systems. This may create challenges for entities that design and manufacture pool automation systems, especially, as it relates to limiting the number of digital connections.

SUMMARY

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the subject matter covered by this patent are defined by the claims below, not this summary. This summary is a high-level overview of various aspects of the subject matter of the present disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for managing pool or spa connections. The computer-implemented method also includes maintaining a first set of permitted connections to a controller, the permitted connections may include at least one pool or spa component connection. The method also includes receiving a connection update instruction to adjust the first set of the permitted connections. The method also includes validating the connection update instruction. The method also includes updating the first set of permitted connections to define a second set of permitted connections based on validating the connection update instruction. Other embodiments of this aspect include corresponding computer systems, apparatus, and computer programs recorded on one or more computer storage devices, each configured to perform the actions of the methods.

Implementations may include one or more of the following features. The computer-implemented method may include enabling at least one of a different pool or spa component to connect to the controller. Maintaining the first set of permitted connections to the controller may include maintaining a permitted connection table that identifies the first set of permitted connections.

Updating the first set of permitted connections to define the second set of permitted connections based on validating the connection update instruction may include updating values in the permitted connection table. Receiving the connection update instruction may include receiving the connection update instruction from at least one of an external server, a user device, or a hardware component. Implementations of the described techniques may include hardware, a method or process, or computer software on a computer-accessible medium.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
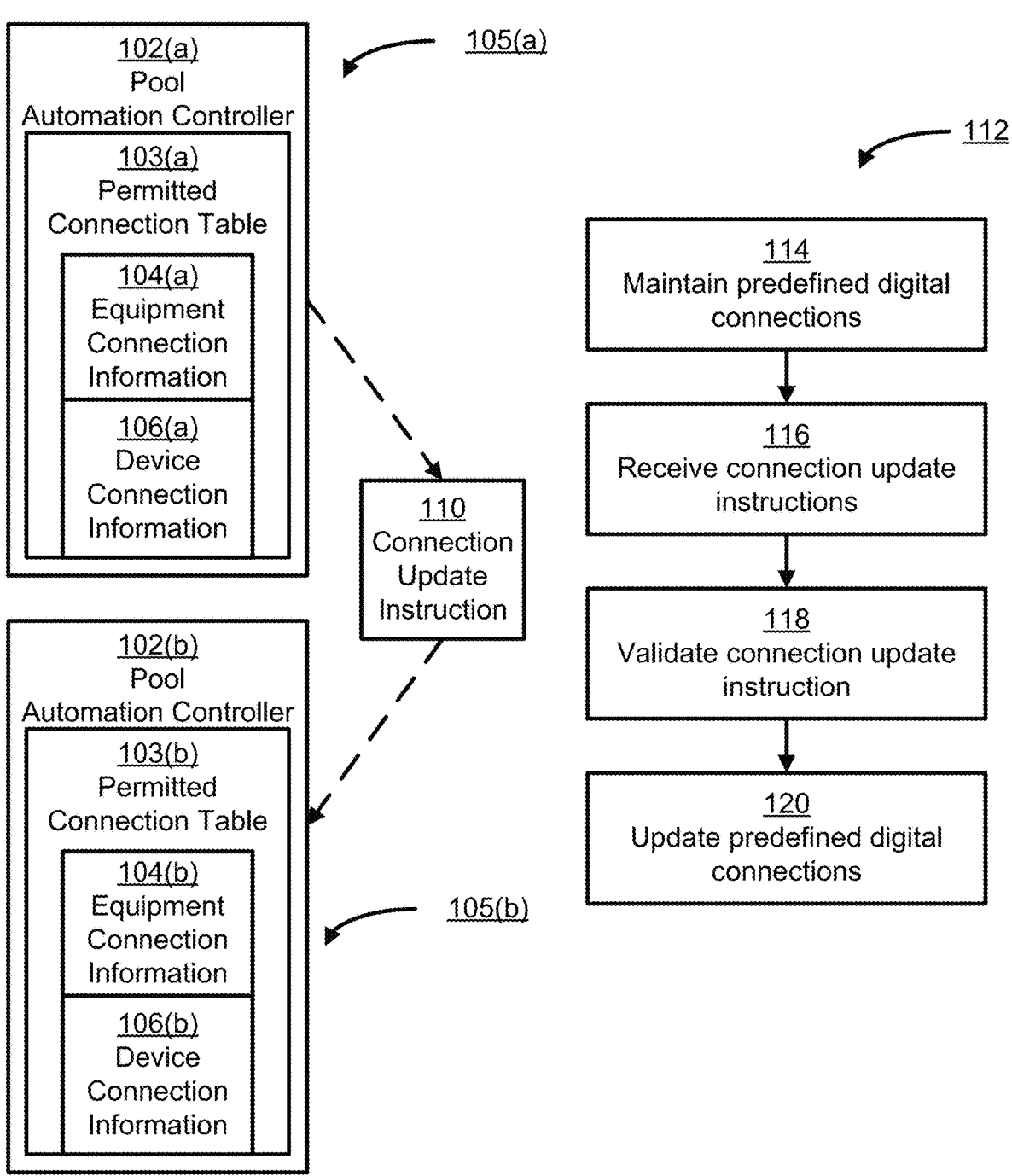
FIG. 1 illustrates an example pool automation controller and a flowchart showing a process for implementing techniques related to managing digital connections to the pool automation controller, according to at least one example.

Examples are described herein in the context of operational parameter sharing in pool and spa systems. Those of ordinary skill in the art will realize that the following description is illustrative only and is not intended to be in any way limiting. For example, the techniques described herein can be used to share operational parameters in systems that include various connected equipment and devices that communicate via different protocols, not just those in pool and spa systems. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application and business-related constraints, and that these specific goals will vary from one implementation to another and from one developer to another.

Examples described herein relate to systems, devices, and techniques for managing digital connections with pool or spa equipment. A pool or spa automation system (which is generally referred to as a pool automation system) may include a pool or spa automation controller (which is generally referred to herein as a pool automation system), which functions to control the operation of various connected components (e.g., devices and equipment). The pool automation controller may be initially configured, via firmware, software, hardware, and/or any combination of the foregoing, to support a predetermined number of digital connections with components having certain characteristics. This predetermined number may be less than a total number of digital connections capable of being supported by the pool automation controller. This may enable manufacturers to sell pool automation controllers at different price points depending on the number (and/or type) of allowed digital connections, while also offering "add-ons" in the form of increases to the number of allowed digital connections.

A pool automation system may include a pool automation controller (e.g., controller) and any suitable number of connected components (which may include connected devices and connected equipment). The pool automation controller may be a computer system that functions as the brain of the pool automation system. Thus, the pool automation controller may include a processor, memory, interfaces, display, I/O capabilities, and any other suitable computing component to enable the techniques described herein. Via digital interfaces of the pool automation controller, the pool automation controller may send and/or receive signals to and/or from the connected components. The interfaces, which may be wired or wireless, may enable two-way communications. For example, the pool automation controller may send control signals to a particular piece of connected equipment (e.g., turn on, turn off, run a sequence, etc.), and the connected equipment may return information to the pool automation controller (e.g., state information, diagnostic information, etc.). In some examples, the pool automation controller may provide relay-based control/power in addition to digital connections, as described herein. Such embodiments may be suitable as legacy systems transition from relays to more digital control.

The automated controller may also enable connections with user devices, other user interfaces, and the like. For example, the automated controller may include a network interface for communicating with a user device via a Bluetooth connection and/or via a local area network such as Wi-Fi. In some examples, the network interfaces may include and/or support cellular connectivity.

The connected equipment may include mechanical equipment such as pumps, heaters, cleaners, covers, valves, skimmers, filters, chlorinators, PH systems, robotic cleaners, water feature pumps, etc. and the connected devices may include devices and other systems such as lighting systems, audio systems, camera systems, environmental and state sensors, control interfaces, and the like. In some examples, at least some of the mechanical equipment may be powered/controlled via relays, while other equipment may be considered "smart" equipment that supports at least some communication with the pool automation controller via digital connections. The connected devices may be controlled similarly as the connected equipment described herein.

Turning now to a particular example, in this example is provided a pool system including a pool automation controller for controlling the number of digital connections permitted by the pool automation controller. The number of digital connections may be stored as a value or other data type in software and/or firmware of the pool automation controller corresponding to a digital connection parameter. The number of permitted digital connections for the pool automation controller may be altered by updating the value in the software and/or firmware using an update mechanism. The update mechanism may be shared with the pool automation controller using a typical channels for updates or may be shared using a different out-of-band update channel. In some examples, the update may be sent over-the-air or may be sent using other techniques. For example, updating the firmware and/or software may be performed in various different ways, e.g., by a signal sent to the pool automation controller (e.g., from a remote server), by a series of interactions with a user device in communication with the remote server, by a physical expansion attached to the pool automation controller, and in other ways described herein. The number of permitted digital connections for the pool automation controller may depend on a payment status related to an account associated with the pool automation controller.

The techniques described herein include a number of technical solutions to technical problems present in the field of pool automation controllers. For example, conventionally, the number of digital connections to a pool automation controller has been open-ended, which can lead to overloading of the system, excessive processing cycles, and other drains on operating efficiency. The techniques described herein solve this problem using by modifying parameters of the software and/or firmware that operates on the pool automation controller, thereby reducing system overloads, processing cycles, and other efficiency drains. In some examples, the benefits may also be realized by pool operators (e.g., ease of operation, cost savings from use of automated control, and the like).

Referring now to the figures, FIG. 1 illustrates an example pool automation controller 102 and a flowchart showing a process 112 for implementing techniques related to managing digital connections to the pool automation controller 102 according to at least one example.

The pool automation controller 102 includes a permitted connection table 103. The permitted connection table 103 is shown in two states, a first state 105(a) and a second state 105(b). The first state 105(a) represents the state of the permitted connection table 103 before the process 112 has been performed by the pool automation controller 102 (referred to as the permitted connection table 103(a)). The second state 105(b) represents the state of the permitted connection table 103 after the process 112 has been performed by the pool automation controller 102 (referred to as permitted connection table 103(*b*)). The permitted connection table 103 may be stored as either firmware or software on the pool automation controller 102.

The permitted connection table 103 may include equipment connection information 104 and device connection information 106. In some examples, the permitted connection table 103 may include permitted connected component information, rather than distinguishing between equipment connections and devices connections. In the first state, the permitted connection table 103(*a*) may include equipment connection information 104(*a*) that identifies a total number of individual connections with pieces of equipment that are supported by the pool automation controller 102(*a*). The permitted connection table 103(*a*) may also include device connection information 106(*a*) that identifies a total number of individual connections with devices that are supported by the pool automation controller 102. Each of the equipment connection information 104(*a*) and the device connection information 106(*a*) may also identify serial numbers for connected components, model names and manufacturers of connected components, address information for communicating with the connected components, state information for the connected components, and the like.

Turning now to the flow diagram depicting the process of 112 in FIG. 1, the process 112 may relate to updating the permitted connections table 103(*a*) to a second state 105(*b*), which includes a second state for the equipment connection information 104(*b*) and a second state for the device connection information 106(*b*) based on validating the connection update instruction 110. The process 112 begins at block 114 by the pool automation controller 102(*a*) maintaining a first set of digital connections. Maintaining the first set of permitted connections to the controller may include maintaining a first state of the permitted connection table 103(*a*) that identifies the first set of permitted connections. Additionally, or alternatively, the permitted connection table 103 may also control access for particular devices or equipment. In the present example, the first state 105(*a*) includes the first state of equipment connection information 104(*a*) and the first state of device connection information 106(*a*).

At block 116, the process 112 includes the pool automation controller 102 receiving a connection update instruction 110 with instructions to adjust the defined number of digital connections. Alternatively, the connection update instruction 110 may contain instructions to adjust the allowed digital connections for particular devices or equipment, or for allowing the pool automation controller 102 to control devices electrically by relay. The connection update instruction 110 may be a firmware or software update for the pool automation controller 102, wherein the connection update instruction 110 updates the permitted connection table 103 from the first state 105(*a*) to the second state 105(*b*) by updating the firmware or software of the pool automation controller 102.

Receiving the connection update instruction 110 may also include receiving the connection update instruction 110 from at least one of an external server (e.g., a server operated by the same entity or an associated entity of the pool automation controller 102), a user device (e.g., a smartphone or tablet associated with an owner of the pool automation controller 102, a technician with access to work on the pool automation controller 102, and the like), or a hardware component (e.g., a hardware device that may be electronically connected to the pool automation controller 102 in any suitable manner and for any suitable duration). Receiving the connection update instruction 110 may include receiving an input at a hardware component of the pool automation controller 102. The connection update instruction 110, when processed by the pool automation controller 102, may configure the pool automation controller 102 to allow a different pool or spa device or a different pool or spa equipment to connect to the pool automation controller 102 and be operated by the pool automation controller 102 (e.g., receive power and/or control instructions from the pool automation controller 102).

In some examples, the connection update instruction 110 may generally identify components to be added to the permitted connection table 103 or may identify such components in more specific detail. For example, the connection update instruction 110 may request an increase in the number of equipment connections, regardless of the type, manufacture, or other characteristic of the equipment. As a specific example, the connection update instruction 110 may request an increase in the number of equipment connections with equipment have certain characteristics (e.g., a skimmer from a certain manufacturer, a pump having a specific volume output, etc.). Thus, the connection update instruction 110 may be used to provide granular updates to the permitted connection table 103, each of which may have its own associated price, may identify that a fixed number of new equipment connections.

At block 118, the process 112 includes validating the connection update instruction 110. Validation procedures may protect the pool automation controller 102 from being exploited or for any other manipulation of privileges. Validating the connection update instruction 110 may include validating that the connection update instruction 110 include a payment verification indicator. The connection update instruction 110 may include validation information, such as encryption keys or digital watermarks. The connection update instruction 110 may request validation information from the pool automation controller 102. Additionally or alternatively, the pool automation controller 102 may send a request to a server (e.g., an API request) with information about the attempted connection, and the server may respond with an approve or deny message. In some examples, a user device may send a connection update request to the server, which may be validated by the server (e.g., authenticate a user operating the user device, etc.) and sent back to the pool automation controller 102 via a network between the server and the pool automation controller 102, directly from the user device, and/or in any other suitable manner.

At block 120, the process 112 includes updating the first set of permitted connections to define a second set of permitted connections based on validating the connection update instruction 110 instruction. Alternatively, the process may include updating a predefined list of particular devices or equipment, or for allowing the pool automation controller 102 to control devices electrically by relay. Updating the predetermined number of permitted connections or updating the predefined list of particular devices or equipment, can include validating the firmware or software update caused by the connection update instruction 110, wherein updating the firmware or software altered the permitted connection table 103 from a first state 105(*a*) to a second state 105(*b*). Validating the firmware or software update may involve communication through one or more network connections with a server device, such as the server device 400 of FIG. 4.

Updating the first predetermined number of permitted connections to define the second set of permitted connections based on validating the connection update instruction 110 includes updating the permitted connection table 103 from the first state 105(*a*) to the second state 105(*b*). In the present example, updating the permitted connection table 103 from the first state 105(*a*) to the second state 105(*b*) includes updating the equipment connection information 104 from the first state 105(*a*) to the second state 105(*b*) as well as updating the device connection information 106 from the first state 105(*a*) to the second state 105(*b*). The connection update instruction 110 may also enable at least one of a different pool or spa device or a different pool or spa equipment to connect to the pool automation controller 102.

Figure 2:
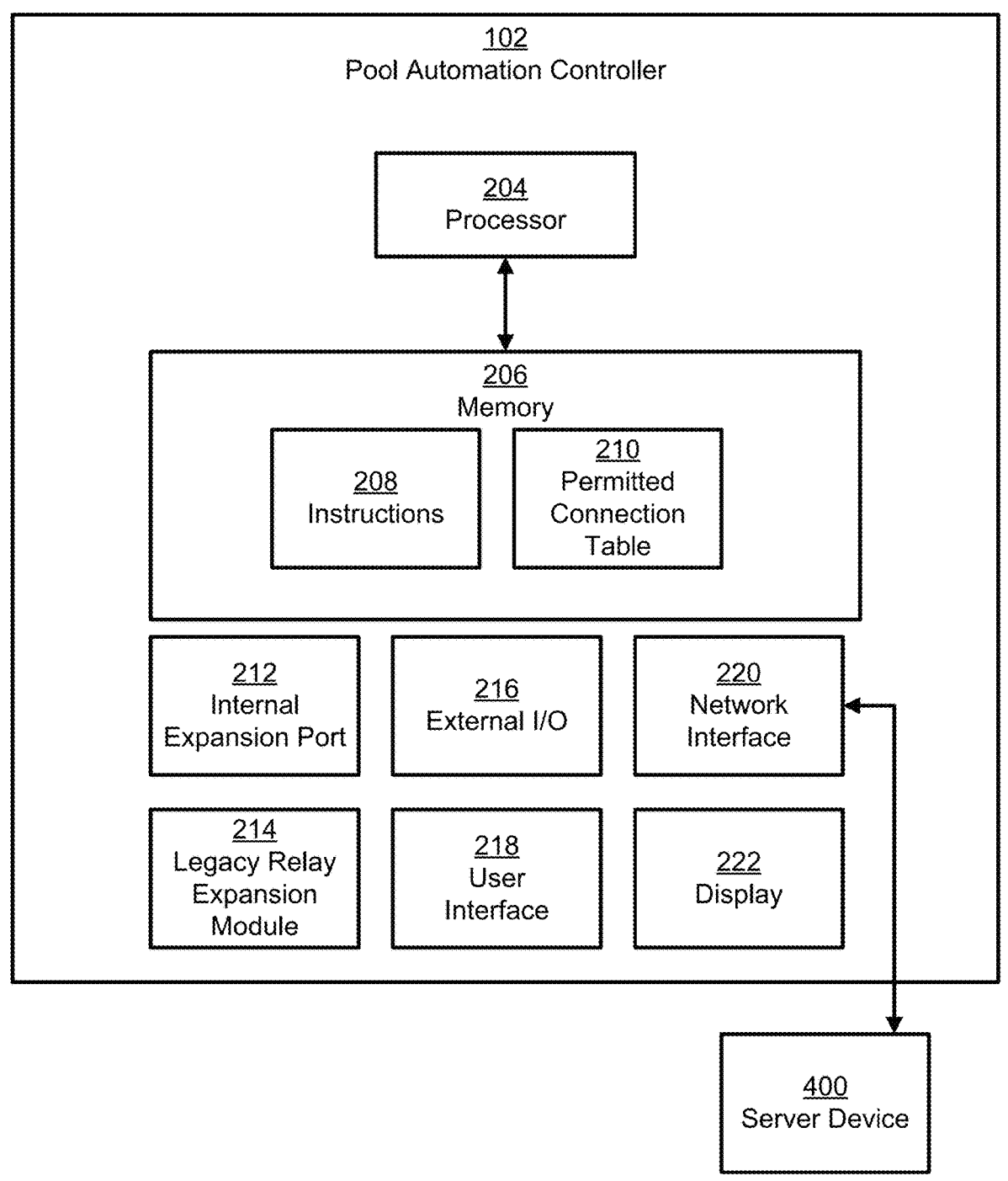
FIG. 2 illustrates an example pool automation controller according to at least one example.

FIG. 2 illustrates an example pool automation controller 102 according to at least one example. The pool automation controller 102 includes a processor 204 that is communicatively coupled to a memory 206. In some examples, the processor 204 and the memory 206 may be distributed from (e.g., remote to) one another. The pool automation controller 102 is connected to a server device 400 via one or more networks, wherein example networks include local area networks (LAN), virtual private networks (VPN), fixed internet connections, mobile internet connections, integrated services digital networks (ISDN), or any other suitable network type.

The processor 204 can include one processing device or multiple processing devices. Non-limiting examples of the processor 204 include a Field-Programmable Gate Array (FPGA), an application-specific integrated circuit (ASIC), a microprocessor, etc. The processor 204 can execute instructions 208 stored in the memory 206 to perform operations. In some examples, the instructions 208 can include processor-specific instructions generated by a compiler or an interpreter from code written in a suitable computer-programming language, such as C, C++, C #, etc.

The memory 206 can include one memory device or multiple memory devices. The memory 206 can be non-volatile and may include any type of memory that retains stored information when powered off. Non-limiting examples of the memory 206 include electrically erasable and programmable read-only memory (EEPROM), flash memory, or any other type of non-volatile memory. At least some of the memory 206 can include a non-transitory, computer-readable medium from which the processor 204 can read instructions 208. A computer-readable medium can include electronic, optical, magnetic, or other storage devices capable of providing the processor 204 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 208.

The memory 206 can also include a permitted connection table 210. The permitted connection table 210 may be represented by either firmware or software. The permitted connection table 210 may limit a number of allowed digital connections with devices or equipment using software or firmware. For example, the permitted connection table 210 may only allow for four connections to the pool automation controller 102. In response to detecting an attempted fifth connection to the pool automation controller 102, instructions 208 may cause the processor 204 to reference the permitted connection table 210 and the instructions 208 may cause the processor 204 to prevent the device or equipment associated with the fifth connection from connected to the pool automation controller 102. The permitted connection table 210 may also limit the number of devices or which types of devices that may be capable of additional features.

The permitted connection table 210 may limit the number of devices or which types of devices are responsive to a remote signal. The permitted connection table 210 may limit devices or equipment responsive to a physical action performed with respect to the pool automation controller 102. For example, the permitted connection table 210 may allow for a water heater to be controlled by the pool automation controller 102 but may prevent the pool automation controller 102 from adjusting the water heater by a spoken command.

The permitted connection table 210 may limit allowed digital connections with devices or equipment based on parameters of the devices or equipment. For example, the permitted connection table 210 may only allow for the pool automation controller 102 to control pumps and lights. In such an example, detecting a chlorinator may cause the processor 204 to limit functionality extended to a chlorinator connected to the pool automation controller 102.

The pool automation controller 102 can also include an internal expansion port 212. The internal expansion port 212 may allow for the replacement of a certain chip or other circuit on the motherboard of the pool automation controller 102, which may alter the number of devices or types of devices the pool automation controller 102 may be permitted to attach to. In some examples, the internal expansion port 212 may, by hardware, limit the number of allowed digital connections to the pool automation controller 102. For example, the internal expansion port 212 may receive a certain chip or circuit that may alter the permitted connection table 210 or serve as an addendum to the permitted connection table 210, thereby expanding either the number or type of devices and equipment useable by the pool automation controller 102.

The pool automation controller 102 can also include at least one external input/output port 216. Example external input/output ports may include USB Ports, an SD Card reader, or the like. In some examples, the external input/output port 216 may limit the number of allowed digital connections with devices or equipment. For example, the external input/output port 216 may receive data that may alter the permitted connection table 210 or serve as an addendum to the permitted connection table 210, thereby expanding either the number or type of devices and equipment useable by the pool automation controller 102.

The pool automation controller 102 can include a network interface 220. Examples of the network interface 220 can include an Ethernet Controller, a Wi-Fi controller, a Bluetooth controller, or any combination network controllers. The network interface connects to a server device 400 by one or more network connections. Example network connections include a local area network (LAN), virtual private network (VPN), fixed internet connection, mobile internet connection, integrated services digital network (ISDN), or any other suitable network type.

In some examples, connections made by the network interface 220 may be limited by the permitted connection table 210. Various devices and equipment may connect with the pool automation controller 102 by the network interface 220. The pool automation controller 102 may limit connections to the network interface 220 so that connections adhere to the permitted connection table 210.

The pool automation controller 102 can include a legacy relay expansion module 214. The legacy relay expansion module 214 may allow for the pool automation controller 102 to control legacy equipment operated by electrically operated switches rather than digital connections. The number or type of connections controlled by the legacy relay expansion module 214 may be different from the number and type of allowed digital connections controlled by the permitted connection table 210, the internal expansion port 212, or the external input/output port 216. The memory 206 may store additional instructions 208 to control a first set of equipment via a set of digital connections based on the first set of permitted connections and control a second set of equipment via a set of relay-based connections based on the first set of permitted connections.

The pool automation controller 102 can include a user interface 218 and a display 222. Examples of the user interface 218 may include scroll buttons, menu buttons, keyboard, keypad, camera, microphone, accelerometer, touchscreen, and the like. Examples of the display 222 may include a touchscreen display, a liquid crystal display, seven segment displays, gauges, dials, indicator lights, speakers, and the like.

Figure 3:
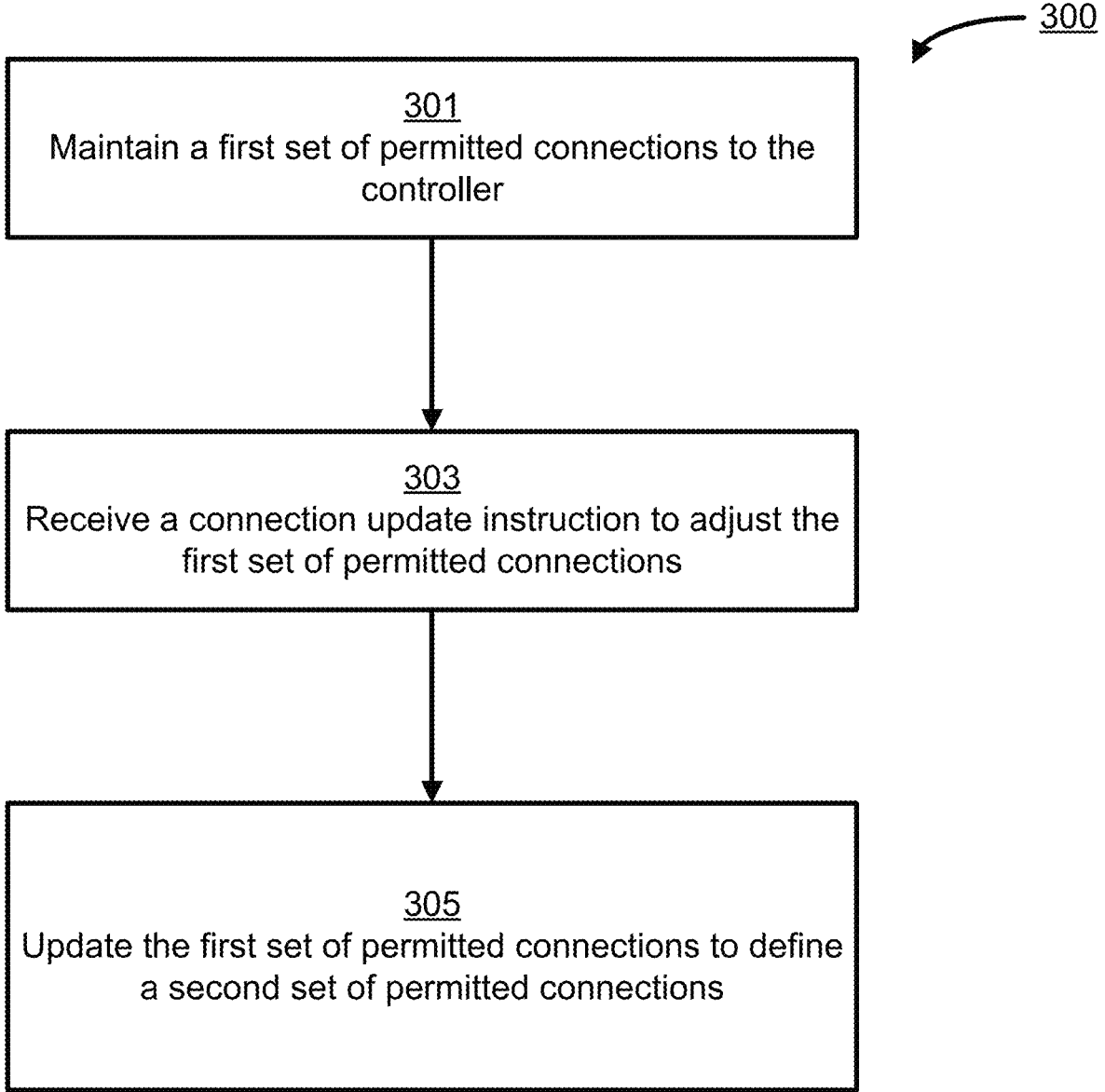
FIG. 3 illustrates an example process for allowing a connection change according to at least one example.

FIG. 3 illustrates an example process 300 for allowing a connection change according to at least one example. The process 300, and any other process described herein (e.g., process 500 of FIG. 5) are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

The process 300 may be performed by the pool automation controller 102. The process may begin at block 301. At block 301, the pool automation controller 102 may maintain a first set of permitted connections to the pool automation controller 102. Additionally or alternatively, the pool automation controller 102 may maintain a defined list of acceptable devices and equipment controllable by the pool automation controller 102. The pool automation controller 102 may maintain the first set of permitted connections or the list of acceptable devices and equipment with the permitted connection table 210 stored in the memory 206. Additionally or alternatively, the pool automation controller 102 may maintain the first set of permitted connections or the defined list of acceptable devices and equipment by a chip or device installed in an expansion port 212 of the pool automation controller 102 or by a digital storage device connected to an external input/output port 216 of the pool automation controller 102.

The pool automation controller 102 may maintain a first set of permitted connections and/or a defined list of acceptable devices and equipment controllable by the pool automation controller 102 (e.g. identified by component type, etc.), by at least one network connection with the server device 400. In some examples, at least one network connection between the pool automation controller 102 and the server device 400 may cause the server device 400 to periodically check to ensure the permitted connection table 210 of the pool automation controller reflects the account permissions 412 stored on the server device 400. In some examples, at least one network connection between the pool automation controller 102 and the server device 400 may cause the server device to constantly check to ensure the permitted connection table 210 of the pool automation controller reflects the account permissions 412 stored on the server device 400. In some examples, the server device 400 may maintain the predefined set of digital connections as a defined number of digital connections, or defined list of acceptable devices and equipment controllable by multiple pool automation controllers associated with the same user.

At block 303, the pool automation controller 102 may receive connection update instructions to adjust the first set of permitted connections. Alternatively, the connection update instruction may contain instructions to adjust the allowed digital connections for particular devices or equipment, or for allowing the pool automation controller 102 to control devices electrically by a legacy relay expansion module 214. In some examples, the process 300 may further include the pool automation controller 102 validating the connection update instruction. If the pool automation controller 102 is unable to validate the connection update instruction, the pool automation controller 102 may continue maintaining the first predefined set of permitted connections. Validation procedures may protect the pool automation controller 102 from being exploited or for any other manipulation of privileges. The connection update instruction may include validation information, such as encryption keys or digital watermarks. The connection update may request validation information from the pool automation controller 102.

Validation procedures may compare the connection update instruction 110 to account permissions stored on a server device to ensure an account may legitimately update the permitted connection table 210. Validation procedures may compare the connection update to encryption keys or other digital safeguards stored on either the memory 206, storage attached to the external input/output port 216, or information stored on at least one chip in the internal expansion port 212 of the pool automation controller 102. Validation procedures may involve registration through a user device with a network connection, such as the user device 608 of FIG. 6.

The connection update instruction may cause the processor 204 of the pool automation controller 102 to update the permitted connection table 210. The connection update instruction may be a firmware or software update. The connection update may be received from a network connection to the server device 400, may be received from a digital storage device attached to the external input/output port 216 of the pool automation controller 102, or may be received from a computer chip or other device installed to the internal expansion port 212 of the pool automation controller 102.

At block 305, the pool automation controller 102 may update the first set of permitted connections to define a second set of permitted connections. Alternatively, the process may include updating a predefined list of particular devices or equipment, or for allowing the pool automation controller 102 to control devices electrically by legacy relay expansion module 214. The list of devices and equipment may be based off model numbers, serial numbers, software versions, or other identifying data stored on or related to devices and equipment controllable by the pool automation controller 102.

The pool automation controller 102 may receive the update as the connection update instruction 110, wherein the connection update instruction 110 updates the firmware or software of the pool automation controller 102 to alter the permitted connection table 210. The connection update instruction 110 may be received by the pool automation controller 102 from a network connection between the network interface 220 of the pool automation controller 102 and a server device 400. Alternatively, the connection update instruction 110 may be received by a chip or other suitable hardware installed into the internal expansion port 212 of the pool automation controller 102. Alternatively, the connection update instruction may be received by a data storage device connected to the external input/output port 216 of the pool automation controller 102.

Figure 4:
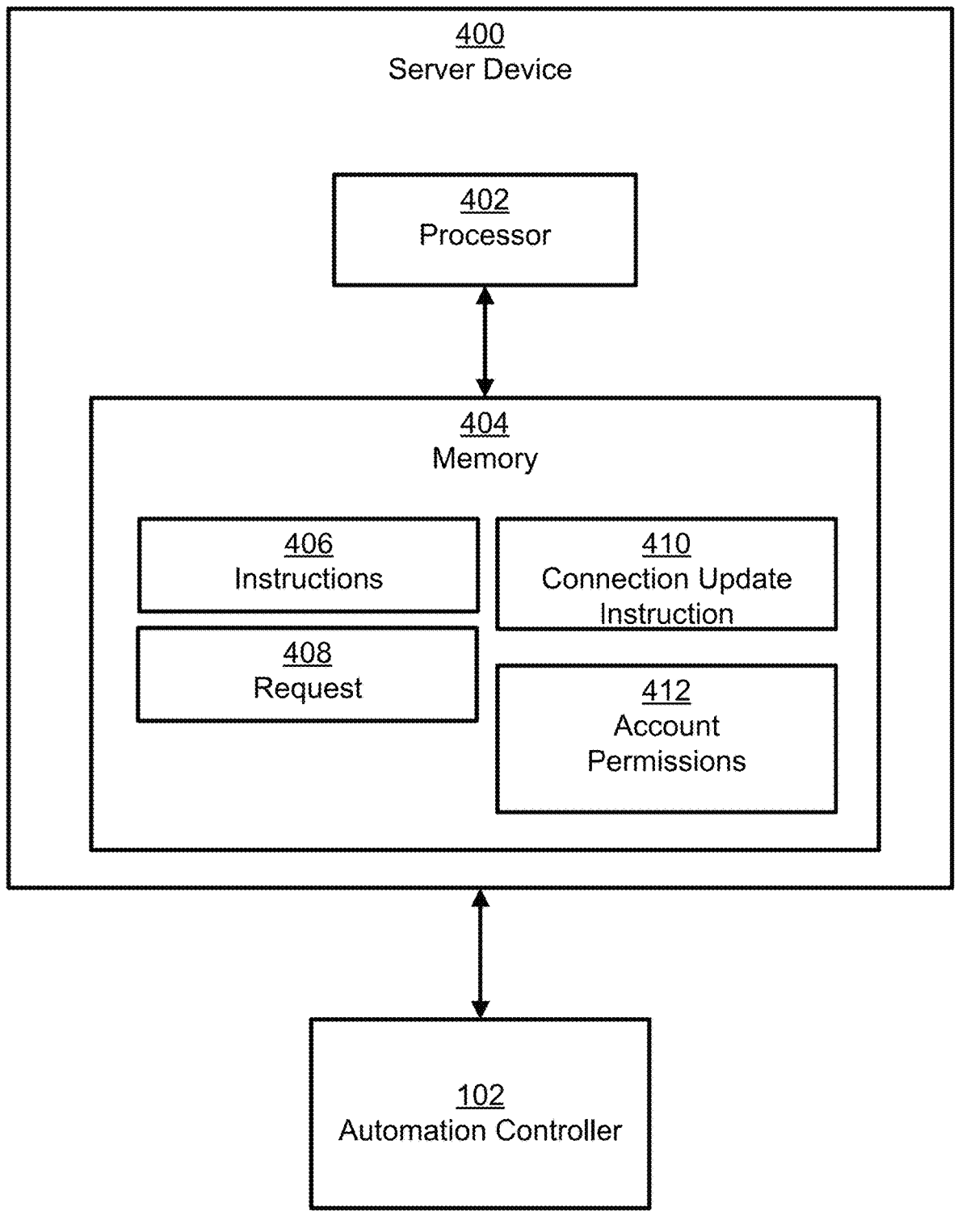
FIG. 4 illustrates an example server device according to at least one example.

FIG. 4 illustrates an example server device 400 according to at least one example. The server device 400 includes a processor 402 that is communicatively coupled to a memory 404. In some examples, the processor 402 and the memory 404 may be distributed from (e.g., remote to) one another. The server device 400 is connected to the pool automation controller 102 via one or more networks, wherein example networks include local area networks (LAN), virtual private networks (VPN), fixed internet connections, mobile internet connections, integrated services digital networks (ISDN), or any other suitable network type.

The processor 402 can include one processing device or multiple processing devices. Non-limiting examples of the processor 402 include a Field-Programmable Gate Array (FPGA), an application-specific integrated circuit (ASIC), a microprocessor, etc. The processor 402 can execute instructions 406 stored in the memory 404 to perform operations. In some examples, the instructions 406 can include processor-specific instructions generated by a compiler or an interpreter from code written in a suitable computer-programming language, such as C, C++, C #, etc.

The memory 404 can include one memory device or multiple memory devices. The memory 404 can be non-volatile and may include any type of memory that retains stored information when powered off. Non-limiting examples of the memory 404 include electrically erasable and programmable read-only memory (EEPROM), flash memory, or any other type of non-volatile memory. At least some of the memory 304 can include a non-transitory, computer-readable medium from which the processor 402 can read instructions 406. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 406.

The memory 404 can also include a request 408, a connection update instruction 110, and account permissions 412. The request 408 may be for altering the account permissions 412. The account permissions 412 may limit the number of digital connections an account may make or may limit the types of devices an account may control. The account permissions 412 may be used to create the connection update instruction 410.

Figure 5:
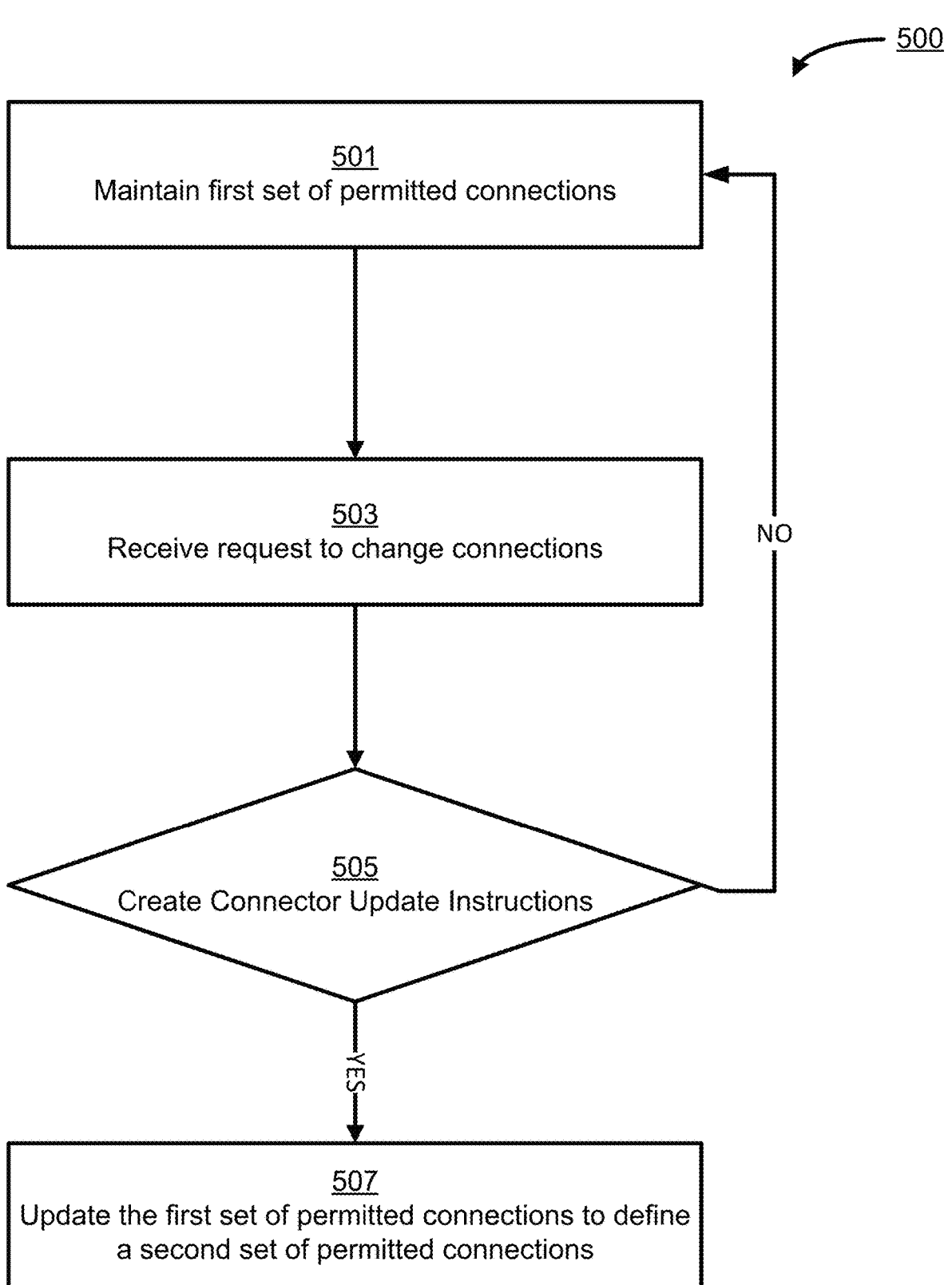
FIG. 5 illustrates an example process for changing connection permissions on a server device according to at least one example.

FIG. 5 illustrates an example process for changing connection permissions on a server device 400 according to at least one example. The process 500 may be performed by a server device 400. The process 500 may begin at block 501. At block 501, the server device 400 may maintain a set of digital connections. Additionally or alternatively, the server device 400 may maintain a defined list of acceptable devices and equipment controllable by the pool automation controller 102. The defined number of digital connections or the defined list of digital connections for a given account may be maintained within an account permissions 412 module. The account permissions 412 module may server as a master copy, defining privileges and limitations for how an account may utilize a pool automated controller. The account permissions 412 may also hold information related to account payments and fees.

The server device 400 may maintain the first set of permitted connections controllable by the pool automation controller 102, by at least one network connection with the pool automation controller 102. In some examples, at least one network connection between the pool automation controller 102 and the server device 400 may cause the server device 400 to periodically check to ensure the permitted connection table 210 of the pool automation controller reflects the account permissions 412 stored on the server device 400. In some examples, at least one network connection between the pool automation controller 102 and the server device 400 may cause the server device 400 to constantly check to ensure the permitted connection table 210 of the pool automation controller reflects the account permissions 412 stored on the server device 400. In some examples, the server device 400 may maintain the defined number of digital connections, or defined list of acceptable devices and equipment controllable by multiple pool automation controllers associated with the same user.

At block 503, the server device 400 may receive a request 408 to change the first set of permitted connections. This request 408 may be for either changing the allowed number of digital connections, chancing the allowed digital connections for particular components, or allowing a pool automation controller 102 to control components electronically by a legacy relay expansion module 214. The request 408 may, if validated by the server device 400, cause the server device 400 to alter the account permissions 412. The request 408 may include instructions for creating a connection update instruction 410. Instructions for creating the connection update instruction 410 may include how the pool automation controller 102 may receive the connection update instruction 410. The request 408 may include verification of payment.

Figure 6:
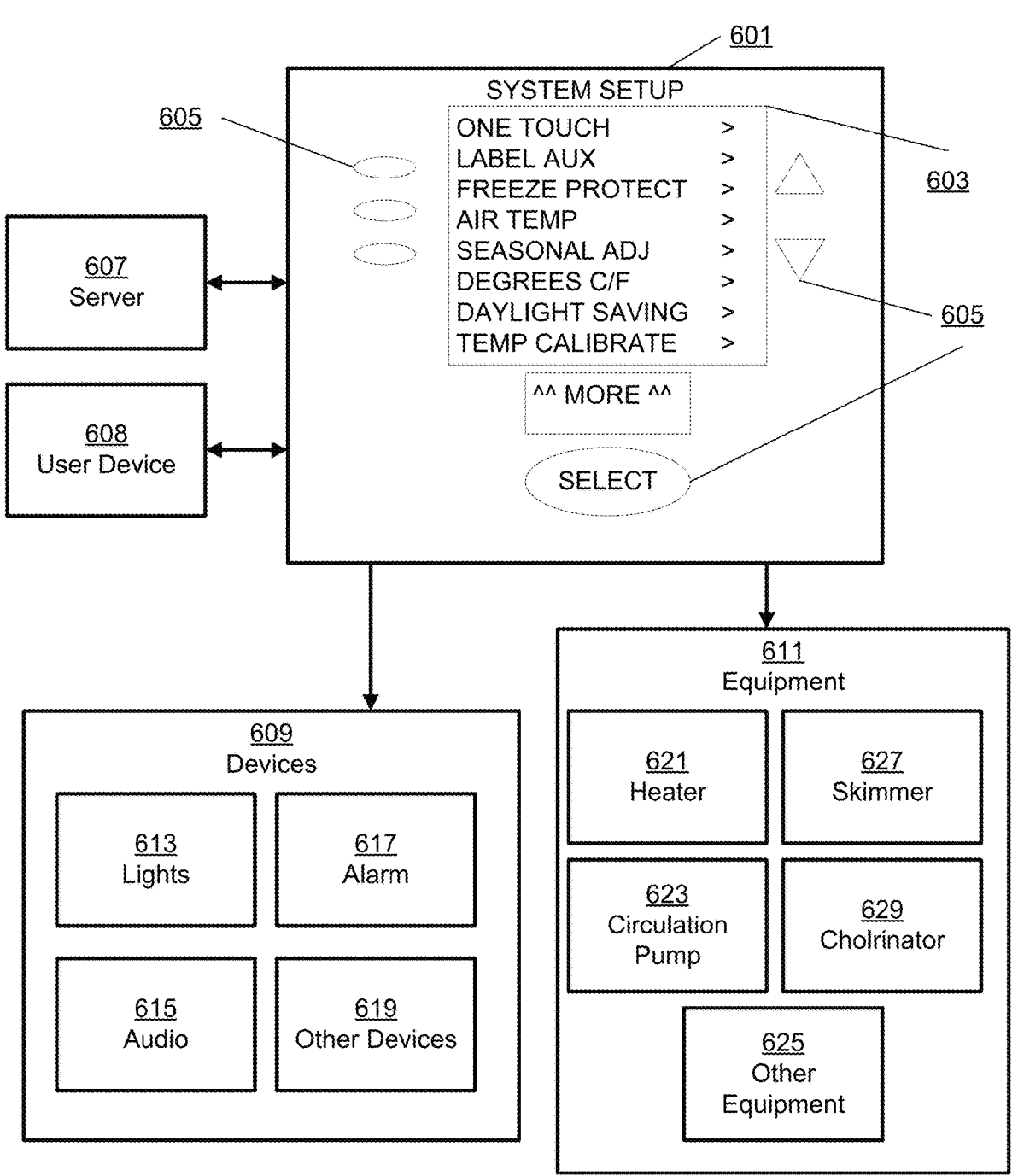
FIG. 6 illustrates an example pool environment controlled by a pool automation controller according to at least one example.

The request 408 may be received from a pool automation controller 102, from a user device, similar to the user device 608 of FIG. 6, or from a technician's device. The request 408 may include validation information, such as encryption keys or digital watermarks.

At block 505, if the server device 400 is able to validate the request, the server device 400 may create the connection update instruction 410. If the server device 400 is unable to validate the request, the server device 400 may continue maintaining predefined digital connections. The connection update instruction 410 may be a firmware or software update. The connection update instruction 410 may be transferred to the pool automation controller 102 by at least one network connection. The connection update instruction 410 may be transferred to an external data storage device, such as a USB drive. The connection update instruction 410 may include validation information, such as encryption keys or digital watermarks. The connection update instruction 410 may request validation information from the pool automation controller 102.

At block 507, the server device 400 may update the set of permitted connections from a first set to a second set by updating the permitted connection table with the connection update instruction 410. The connection update instruction 410 may raise or lower the set of digital connections by changing the permitted connection table of the pool automation controller 102. The connection update instruction 410 may change the list of components controllable by the pool automation controller 102. The list of devices and equipment may be based off model numbers, serial numbers, software versions, or other identifying data stored on or related to components controllable by the pool automation controller 102.

The pool automation controller 102 may receive the update as the connection update instruction 110, wherein the connection update instruction 110 updates the firmware or software of the pool automation controller 102 to alter the permitted connection table 210. The connection update instruction 110 may be received by the pool automation controller 102 from a network connection between the network interface 220 of the pool automation controller 102 and the server device 400. Alternatively, the connection update instruction 110 may be received by a chip or other suitable hardware installed into the internal expansion port 212 of the pool automation controller 102. Alternatively, the connection update instruction may be received by a data storage device connected to the external input/output port 216 of the pool automation controller 102. Alternatively, the connection update instruction 110 may be received by a user device, such as the user device 608 of FIG. 6. In examples where the firmware or software of the pool automation controller 102 is updated by suitable hardware installed into the internal expansion port 212 or data storage connected to the external input/output port 216 of the pool automation controller, the network connection between the pool automation controller 102 and the server device 400 may still be used to validate the connection update instruction 410.

FIG. 6 illustrates an example pool environment controlled by a pool automation controller 601 according to at least one example. The pool automation controller 601 includes a user interface 605 and a display 603. The pool automation controller 601 has at least one network connection with a server 607. The pool automation controller 601 also has at least one network connection with a user device 608. The pool automation controller 601 controls various devices 609 and equipment 611. Devices include lights 613, an alarm 617, audio device 615, and other devices 619 (e.g., components that are controlled by a digital connection such as those described herein such as sensors, cameras, etc.). Equipment 611 includes a heater 621, a circulation pump 623, a skimmer 627, a chlorinator 629, and other equipment 625 (e.g., those described herein, etc.).

The pool automation controller 601 may be controlled by the user device 608. The pool automation controller 601 and the user device 608 may be connected by wired network connection or by wireless network connection. The pool automation controller 601 and user device 608 may be connected by any appropriate wireless standard, such as Bluetooth, Wi-Fi, or near filed communication. Example user devices 608 can include smartphones, laptops, smart watches, smart speakers, or remotes. User devices 608 may control the pool automation controller 601 either by an application specific to the pool automation controller 601 or by a secured webpage for controlling the pool automation controller 601.

A permitted connection table of the pool automation controller 601, similar to the permitted connection table 103 of the pool automation controller 102 of FIG. 1, may be stored by the pool automation controller 601, which may control what devices and equipment the pool automation controller 601 may presently control. For example, the permitted connection table of the pool automation controller 601 may allow the pool automation controller 601 to control the heater 621 and the circulation pump 623, but not the chlorinator 629.

The permitted connection table of the pool automation controller 601 may control which aspects of devices 609 or equipment 611 are controllable by the pool automation controller 601 or by the user device 608. For example, the permitted connection table may allow full control of the heater 621 from the user interface 605 of the pool automation controller 601 but may not allow the heater 621 to be controlled from the user device 608.

The permitted connection table of the pool automation controller 601 may be updated by the server 607 with a connection update instruction, which may be similar to the connection update instruction 110 of FIG. 1.

In some examples, the user device 608 may be used to validate connection information updates. In some such examples, the pool automation controller 601 may not have a network connection to the server 607. The user device 608 may be used to transfer the connection information update to the pool automation controller 601 and may be used to validate that account permissions match the permitted connection table of the pool automaton controller after the connection information update is applied to the firmware or software of the pool automaton controller 601.

In the following, further examples are described to facilitate the understanding of the present disclosure.

Example 1. In this example there is provided a controller for managing pool or spa connections, including:
   a memory to store computer-executable instructions; and
   a processor configured to access the memory and execute the computer-executable instructions to at least:
      maintain a first set of permitted connections to the controller, the permitted connections including at least one pool or spa component connection;
      receive a connection update instruction to adjust the first set of the permitted connections; and
      update the first set of permitted connections to define a second set of permitted connections based on validating the connection update instruction.

Example 2. In this example, there is provided a controller of any of the subsequent or preceding claims, wherein the memory of the controller further includes additional computer-executable instructions, and the processor is further able to access the memory and execute the additional computer-executable instructions to at least enable at least one of a different pool or spa device or a different pool or spa equipment to connect to the controller.

Example 3. In this example, there is provided a controller of any of the subsequent or preceding claims, wherein maintaining the first set of permitted connections to the controller includes maintaining a permitted connection table that identifies the first set of permitted connections.

Example 4. In this example, there is provided a controller of any of the subsequent or preceding claims, wherein updating the first set of permitted connections to define the second set of permitted connections includes updating values in the permitted connections table, wherein the values correspond to at least one of a number of permitted connections or a type of permitted connection.

Example 5. In this example, there is provided a controller of any of the subsequent or preceding claims, wherein receiving the connection update instruction includes receiving the connection update instruction from at least one of an external server, a user device, or a hardware component.

Example 6. In this example, there is provided a controller of any of the subsequent or preceding claims, wherein the first set of permitted connections and the second set of permitted connections are defined by either a number of permitted connections or types of permitted connections.

Example 7. In this example, there is provided a controller of any of the subsequent or preceding claims, wherein updating the first set of permitted connections to define the second set of permitted connections includes validating the connection update instruction.

Example 8. In this example, there is provided a controller of any of the subsequent or preceding claims, wherein the memory may store additional computer-executable instructions, and the processor may access the memory and execute the additional computer-executable instructions to at least control a first set of equipment via a set of digital connections based on the first set of permitted connections, and control a second set of equipment via a set of relay-based connections based on the first set of permitted connections.

Example 9. In this example, there is a computer computer-implemented method for managing pool or spa connections, including:

maintaining a first set of permitted connections to a controller, the permitted connections including at least one pool or spa component connection;

receiving a connection update instruction to adjust the first set of the permitted connections; and updating the first set of permitted connections to define a second set of permitted connections.

Example 10. In this example, there is provided a method of any of the subsequent or preceding claims, further including enabling at least one of a different pool or spa component comprising a device or equipment to connect to the controller.

Example 11. In this example, there is provided a method of any of the subsequent or preceding claims, wherein maintaining the first set of permitted connections to the controller includes maintaining a permitted connection table that identifies the first set of permitted connections.

Example 12. In this example, there is provided a method of any of the subsequent or preceding claims, wherein updating the first set of permitted connections to define the second set of permitted connections includes validating the connection update instruction by updating values in the permitted connection table.

Example 13. In this example, there is provided a method of any of the subsequent or preceding claims, wherein receiving the connection update instruction includes receiving the connection update instruction from at least one of an external server, a user device, or a hardware component.

Example 14. In this example, there is provided one or more non-transitory computer-readable media including computer-executable instructions that, when executed by a process of a spa or pool controller, cause the spa or pool controller to perform operations including:

maintaining a first set of permitted connections to a controller, the permitted connections including at least one pool or spa component connection;

receiving a connection update instruction to adjust the first set of the permitted connections; and updating the first set of permitted connections to define a second set of permitted connections.

Example 15. In this example, there is provided one or more non-transitory computer-readable media of any of the subsequent or preceding claims, wherein the first set of permitted connections and the second set of permitted connections are defined by either a number of permitted connections or types of permitted connections.

Example 16. In this example, there is provided one or more non-transitory computer-readable media of any of the subsequent or preceding claims, updating the first set of permitted connections to define a second set of permitted connections includes validating the connection update instruction.

Example 17. In this example, there is provided one or more non-transitory computer-readable media of any of the subsequent or preceding claims, wherein the computer-readable media includes additional computer-executable instructions that, when executed, cause the processor to perform additional operations including enabling at least one of a different pool or spa component comprising a device or equipment to connect to the controller.

Example 18. In this example, there is provided one or more non-transitory computer-readable media of any of the subsequent or preceding claims, wherein maintaining the first set of permitted connections to the controller includes maintaining a permitted connection table that identifies the first set of permitted connections.

Example 19. In this example, there is provided one or more non-transitory computer-readable media of any of the subsequent or preceding claims, wherein updating the first set of permitted connections to define the second set of permitted connections based on validating the connection update instruction.

Example 20. In this example, there is provided one or more non-transitory computer-readable media of any of the subsequent or preceding claims, wherein receiving the connection update instruction includes receiving the connection update instruction from at least one of an external server, a user device, or a hardware component.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions, and changes in the form of the methods and systems described herein may be made without departing from the spirit of the present disclosure. The accompanying claims and their equivalents are intended to cover such forms or modifications as would fall within the scope and spirit of the present disclosure.

Although applicant has described devices and techniques for use principally with swimming pools and spas, persons skilled in the relevant field will recognize that the present invention may be employed in connection with other objects and in other manners. Finally, references to "pools" and "swimming pools" herein may also refer to spas or other water containing vessels used for recreation or therapy and for which cleaning is needed or desired.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

All references, including publications, patent applications, and patents, cited herein are hereby incorporated by reference to the same extent as if each reference were individually and specifically indicated to be incorporated by reference and were set forth in its entirety herein.

What is claimed is:

1. A controller for managing pool or spa connections, comprising:

a memory configured to store computer-executable instructions; and a processor configured to access the memory and execute the computer-executable instructions to at least:

maintain, in the memory of the controller, a first predefined number of permitted connections to the controller, the permitted connections comprising at least one pool or spa component connection, the first predefined number of the permitted connections identifying a first total number of individual digital connections supported by the controller;

receive a connection update instruction to adjust the first predefined number of the permitted connections; and after validation of the connection update instruction using a validation procedure, update the first predefined number of the permitted connections to define a second predefined number of the permitted connections, the second predefined number of the permitted connections identifying a second total number of individual digital connections supported by the controller.

2. The controller of claim 1, wherein the memory is further configured to store additional computer-executable instructions, and the processor is further configured to access the memory and execute the additional computer-executable instructions to at least enable at least one of a different pool or spa component comprising a device or equipment to connect to the controller.

3. The controller of claim 1, wherein maintaining the first predefined number of the permitted connections to the controller comprises maintaining a permitted connection table that identifies the first predefined number of the permitted connections.

4. The controller of claim 3, wherein updating the first predefined number of the permitted connections to define the second predefined number of the permitted connections comprises updating values in the permitted connection table, wherein the values correspond to at least one of a number of permitted connections or a type of permitted connection.

5. The controller of claim 1, wherein receiving the connection update instruction comprises receiving the connection update instruction from at least one of an external server, a user device, or a hardware component.

6. The controller of claim 1, wherein the first predefined number of the permitted connections and the second predefined number of the permitted connections are defined by either a number of permitted connections or types of permitted connections.

7. The controller of claim 1, wherein updating the first predefined number of the permitted connections to define the second predefined number of the permitted connections includes receiving confirmation of the validation procedure.

8. The controller of claim 1, wherein the memory is further configured to store additional computer-executable instructions, and the processor is further configured to access the memory and execute the additional computer-executable instructions to at least control a first set of equipment via a set of digital connections based on the first predefined number of the permitted connections, and control a second set of equipment via a set of relay-based connections based on the first predefined number of the permitted connections.

9. The controller of claim 1, wherein the memory is further configured to store additional computer-executable instructions, and the processor is further configured to access the memory and execute the additional computer-executable instructions to at least:
    communicate validation information a remote server, the validation information useable by the remote server to perform the validation procedure.

10. The controller of claim 1, wherein the validation procedure is based at least in part on a payment verification indicator, encryption keys, or digital watermarks.

11. A computer-implemented method for managing pool or spa connections, comprising:
    maintaining, in a memory of a controller, a first predefined number of permitted connections to the controller, the permitted connections comprising at least one pool or spa component connection, the first predefined number of the permitted connections identifying a first total number of individual digital connections supported by the controller;
receiving a connection update instruction to adjust the first predefined number of the permitted connections; and
after validation of the connection update instruction using a validation procedure, updating the first predefined number of the permitted connections to define a second predefined number of the permitted connections, the second predefined number of the permitted connections identifying a second total number of individual digital connections supported by the controller.

12. The computer-implemented method of claim 11, wherein maintaining the first predefined number of the permitted connections to the controller comprises maintaining a permitted connection table that identifies the first predefined number of the permitted connections.

13. The computer-implemented method of claim 12, wherein updating the first predefined number of the permitted connections to define the second predefined number of the permitted connections comprises validating the connection update instruction by updating values in the permitted connection table.

14. The computer-implemented method of claim 11, wherein receiving the connection update instruction comprises receiving the connection update instruction from at least one of an external server, a user device, or a hardware component.

15. One or more non-transitory computer-readable media comprising computer-executable instructions that, when executed by a processor of a spa or pool controller, causes the spa or pool controller to perform operations comprising:
    maintaining, in a memory of the controller, a first predefined number of permitted connections to the controller, the permitted connections comprising at least one pool or spa component connection, the first predefined number of the permitted connections identifying a first total number of individual digital connections supported by the controller;
    receiving a connection update instruction to adjust the first predefined number of the permitted connections; and
    after validation of the connection update instruction using a validation procedure, updating the first predefined number of the permitted connections to define a second predefined number of the permitted connections, the second predefined number of the permitted connections identifying a second total number of individual digital connections supported by the controller.

16. The one or more non-transitory computer-readable media of claim 15, wherein updating the first predefined number of the permitted connections to define the second predefined number of the permitted connections includes receiving confirmation of the validation procedure.

17. The one or more non-transitory computer-readable media of claim 15, wherein the computer-readable media comprises additional computer-executable instructions that, when executed, cause the processor to perform additional operations comprising enabling at least one of a different pool or spa component comprising a device or equipment to connect to the controller.

18. The one or more non-transitory computer-readable media of claim 15, wherein maintaining the first predefined number of the permitted connections to the controller comprises maintaining a permitted connection table that identifies the first predefined number of the permitted connections.

19. The one or more non-transitory computer-readable media of claim 18, wherein maintaining the permitted connection table is based at least in part on validation of the connection update instruction.

20. The one or more non-transitory computer-readable media of claim 15, wherein receiving the connection update instruction comprises receiving the connection update instruction from at least one of an external server, a user device, or a hardware component.

\* \* \* \* \*